United States Patent
Asokan et al.

(10) Patent No.: US 12,243,050 B2
(45) Date of Patent: Mar. 4, 2025

(54) SYSTEMS AND METHODS FOR PROVISIONING TRANSACTION DATA TO MOBILE COMMUNICATIONS DEVICES

(71) Applicant: American Express Travel Related Services Company, Inc., New York, NY (US)

(72) Inventors: Sandeep K. Asokan, Phoenix, AZ (US); Michael J. Bailey, Peoria, AZ (US); Joe Buselmeier, Phoenix, AZ (US); Manish K. Deliwala, Chandler, AZ (US); Chintan Mehta, Peoria, AZ (US); Keshav A. Narispur, Chandler, AZ (US); Manoj K. Thulaseedharanpillai, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1 day.

(21) Appl. No.: 18/106,017

(22) Filed: Feb. 6, 2023

(65) Prior Publication Data
US 2023/0186288 A1    Jun. 15, 2023

Related U.S. Application Data

(63) Continuation of application No. 16/821,183, filed on Mar. 17, 2020, now Pat. No. 11,599,877, which is a
(Continued)

(51) Int. Cl.
*G06Q 20/38* (2012.01)
*G06Q 20/32* (2012.01)
(Continued)

(52) U.S. Cl.
CPC ..... *G06Q 20/3821* (2013.01); *G06Q 20/3272* (2013.01); *G06Q 20/3274* (2013.01);
(Continued)

(58) Field of Classification Search
None
See application file for complete search history.

(56) References Cited

U.S. PATENT DOCUMENTS 2,128,809 A    8/1938  Fogg
8,150,762 B1   4/2012  Reed
(Continued)

FOREIGN PATENT DOCUMENTS

CA    2868581 C      3/2016
CN    103443813 A   12/2013
(Continued)

OTHER PUBLICATIONS

Tiwari et al. A Multi-Factor Security Protocol for Wireless Payment—Secure Web Authentication Using Mobile Devices. Computer Science Cryptography and Security, Cornell University. https://arxiv.org/abs/1111.3010 (Year: 2011).*
(Continued)

*Primary Examiner* — El Mehdi Oussir (57) ABSTRACT

The system comprises approving a credit application during a single http session, transmitting an encoded secure token to a web-client participating in the http session, receiving from the mobile communications device the secure token, and transmitting the transaction account data to the mobile communications device, in response to the receiving the secure token. The system may further comprise the mobile communications device decoding the secure token.

9 Claims, 2 Drawing Sheets

Related U.S. Application Data continuation of application No. 14/293,864, filed on Jun. 2, 2014, now abandoned.

(51) Int. Cl.
*G06Q 20/34* (2012.01)
*G06Q 20/36* (2012.01)
*G06Q 20/42* (2012.01)

(52) U.S. Cl.
CPC ..... *G06Q 20/3276* (2013.01); *G06Q 20/3552* (2013.01); *G06Q 20/36* (2013.01); *G06Q 20/425* (2013.01); *G06Q 2220/00* (2013.01)

(56) References Cited

U.S. PATENT DOCUMENTS

| | | | |
|---|---|---|---|
| 8,172,135 B1 | 5/2012 | Aidasani | |
| 8,332,323 B2 | 12/2012 | Stals | |
| 8,336,764 B2 | 12/2012 | Crawford | |
| 8,977,234 B2 | 3/2015 | Chava | |
| 9,519,802 B2 * | 12/2016 | Dutta | G06F 21/602 |
| 9,760,871 B1 | 9/2017 | Pourfallah | |
| 9,882,885 B2 * | 1/2018 | Ren | H04W 12/06 |
| 9,887,979 B1 * | 2/2018 | Pandita | H04L 63/0815 |
| 9,934,535 B2 * | 4/2018 | Arora | G06Q 40/02 |
| 9,953,311 B2 * | 4/2018 | Flurscheim | G06K 19/06112 |
| 10,068,228 B1 | 9/2018 | Winklevoss | |
| 10,204,337 B1 | 2/2019 | Spector | |
| 10,333,921 B2 * | 6/2019 | Narayan | H04L 63/0807 |
| 11,080,669 B1 * | 8/2021 | Walker | G06Q 20/02 |
| 11,080,696 B2 | 8/2021 | Flurscheim | |
| 11,210,648 B2 | 12/2021 | Ortiz | |
| 11,615,414 B2 * | 3/2023 | Ortiz | G06Q 20/38215 705/44 |
| 11,954,690 B2 * | 4/2024 | Salama | G06Q 20/34 |
| 2003/0028481 A1 | 2/2003 | Flitcroft | |
| 2005/0102188 A1 | 5/2005 | Hutchison | |
| 2006/0165060 A1 | 7/2006 | Dua | |
| 2006/0229978 A1 | 10/2006 | Popovic | |
| 2007/0170247 A1 | 7/2007 | Friedman | |
| 2007/0198432 A1 | 8/2007 | Pitroda et al. | |
| 2009/0288012 A1 | 11/2009 | Hertel et al. | |
| 2010/0250271 A1 | 9/2010 | Pearce | |
| 2011/0276418 A1 | 11/2011 | Velani | |
| 2011/0307318 A1 | 12/2011 | Laporte | |
| 2012/0024946 A1 * | 2/2012 | Tullis | G06Q 20/042 235/379 |
| 2012/0028609 A1 * | 2/2012 | Hruska | H04W 12/02 455/411 |
| 2012/0039469 A1 | 2/2012 | Mueller | |
| 2012/0066501 A1 | 3/2012 | Xiong | |
| 2012/0130866 A1 | 5/2012 | Cooke | |
| 2012/0130888 A1 | 5/2012 | Cooke | |
| 2012/0131094 A1 | 5/2012 | Lyons | |
| 2012/0158589 A1 | 6/2012 | Katzin | |
| 2012/0160912 A1 | 6/2012 | Laracey | |
| 2012/0203693 A1 | 8/2012 | Morgan | |
| 2012/0246075 A1 | 9/2012 | Rasti | |
| 2012/0303425 A1 | 11/2012 | Katzin et al. | |
| 2012/0310826 A1 | 12/2012 | Chatterjee | |
| 2012/0323691 A1 | 12/2012 | McLaughlin | |
| 2013/0024371 A1 | 1/2013 | Hariramani | |
| 2013/0054336 A1 | 2/2013 | Graylin | |
| 2013/0066749 A1 | 3/2013 | Cooke | |
| 2013/0110690 A1 * | 5/2013 | Greiner | H04L 63/1416 705/35 |
| 2013/0124855 A1 | 5/2013 | Varadarajan | |
| 2013/0159081 A1 | 6/2013 | Shastry | |
| 2013/0179336 A1 | 7/2013 | Lyons | |
| 2013/0218721 A1 | 8/2013 | Borhan | |
| 2013/0238455 A1 * | 9/2013 | Laracey | G06Q 20/102 705/21 |
| 2013/0247146 A1 | 9/2013 | Lyon | |
| 2013/0256403 A1 | 10/2013 | MacKinnon Keith | |
| 2013/0290234 A1 | 10/2013 | Harris | |
| 2013/0346302 A1 * | 12/2013 | Purves | G06Q 20/102 705/40 |
| 2014/0019352 A1 | 1/2014 | Shrivastava | |
| 2014/0040617 A1 * | 2/2014 | Fernandez de Torres | H04L 9/3215 713/168 |
| 2014/0067675 A1 | 3/2014 | Leyva | |
| 2014/0067677 A1 | 3/2014 | Ali | |
| 2014/0070001 A1 | 3/2014 | Sanchez | |
| 2014/0074637 A1 | 3/2014 | Hammad | |
| 2014/0108263 A1 | 4/2014 | Ortiz | |
| 2014/0143075 A1 | 5/2014 | Eason, Jr. | |
| 2014/0149293 A1 | 5/2014 | Laracey | |
| 2014/0172531 A1 | 6/2014 | Liberty | |
| 2014/0257886 A1 | 9/2014 | Higgins | |
| 2014/0263618 A1 | 9/2014 | McCarthy | |
| 2014/0279474 A1 | 9/2014 | Evans | |
| 2014/0279499 A1 | 9/2014 | Kane | |
| 2014/0337175 A1 | 11/2014 | Katzin | |
| 2015/0012426 A1 | 1/2015 | Purves | |
| 2015/0012435 A1 | 1/2015 | Ramavarjula | |
| 2015/0058144 A1 | 2/2015 | Seligstein | |
| 2015/0087427 A1 | 3/2015 | Wane | |
| 2015/0199689 A1 * | 7/2015 | Kumnick | G06Q 20/3674 705/67 |
| 2015/0248664 A1 | 9/2015 | Makhdumi | |
| 2015/0278805 A1 | 10/2015 | Spencer, III | |
| 2015/0312038 A1 * | 10/2015 | Palanisamy | G06Q 20/385 713/155 |
| 2015/0332258 A1 | 11/2015 | Kurabi | |
| 2015/0348039 A1 * | 12/2015 | Allen | G06Q 20/36 705/44 |
| 2015/0363833 A1 * | 12/2015 | Basheer | G06Q 20/08 705/14.27 |
| 2016/0012465 A1 * | 1/2016 | Sharp | G06Q 20/321 705/14.17 |
| 2016/0019536 A1 * | 1/2016 | Ortiz | G06Q 20/36 705/67 |
| 2016/0321489 A1 | 11/2016 | Scipioni | |
| 2017/0004422 A1 | 1/2017 | Todd | |
| 2017/0249622 A1 | 8/2017 | Ortiz | |
| 2018/0181998 A1 * | 6/2018 | Basheer | G06Q 30/0281 |
| 2018/0189892 A1 * | 7/2018 | Arora | G06Q 40/02 |
| 2018/0253775 A1 | 9/2018 | Zises | |
| 2019/0281030 A1 | 9/2019 | Isaacson | |
| 2022/0019995 A1 * | 1/2022 | Ngo | G06Q 20/385 |
| 2022/0051231 A1 | 2/2022 | Laracey | |
| 2023/0186288 A1 * | 6/2023 | Asokan | G06Q 20/3274 705/76 |
| 2024/0104530 A1 * | 3/2024 | Singhal | H04W 12/77 |

FOREIGN PATENT DOCUMENTS

| | | | |
|---|---|---|---|
| CN | 104599408 A | 5/2015 | |
| CN | 105830390 A | 8/2016 | |
| CN | 107209889 A | 9/2017 | |
| EP | 2128809 | 12/2009 | |
| JP | 2003150876 A | 5/2003 | |
| JP | 2008129655 A | 6/2008 | |
| JP | 2008305392 A | 12/2008 | |
| JP | 2017527871 A | 9/2017 | |
| WO | 2007018233 A1 | 2/2007 | |
| WO | WO-2007044500 A2 * | 4/2007 | G06F 21/606 |
| WO | 2012088512 A3 | 10/2012 | |
| WO | 2014055279 A1 | 4/2014 | |
| WO | 2016134016 A1 | 8/2016 | |

OTHER PUBLICATIONS

Xi et al., A fingerprint based bio-cryptographic security protocol designed for client/server authentication in mobile computing environment. Curity and Communication Networks Security Comm. Networks 2011; 4:487-499. https://onlinelibrary.wiley.com/doi/pdf/10.1002/sec.225 (Year: 2011).*

R. Abdellaoui and M. Pasquet, "Secure Communication for Internet Payment in Heterogeneous Networks," 2010 24th IEEE Interna- (56) References Cited

OTHER PUBLICATIONS tional Conference on Advanced Information Networking and Applications, Perth, WA, Australia, 2010, pp. 1085-1092.https://ieeexplore.ieee.org/document/5474833?source=IQplus (Year: 2010).*
E. Grosse and M. Upadhyay, "Authentication at Scale," in IEEE Security & Privacy, vol. 11, No. 1, pp. 15-22, Jan.-Feb. 2013. https://ieeexplore.ieee.org/document/6381399?source=IQplus (Year: 2013).*
Examination Report in co-pending, related JP Application No. 2019-054742 mailed Jun. 15, 2020.
Examination Report in co-pending, related EP Application No. 15803107.0, mailed Mar. 31, 2020.
International Preliminary Report on Patentability dated Feb. 5, 2016 in Application No. PCT/US2015/032851.
International Preliminary Report and Written Opinion dated Aug. 26, 2015 in Application No. No. PCT/US2015/032851.
EP Search Report dated Nov. 22, 2017 in EP Application No. 15803107.0.
Office Action dated Jan. 14, 2018 in Australian App No. 2015271025.
Japan Office Action Mar. 6, 2018 in JP App No. 2016-570314.
Final Office Action dated Nov. 21, 2019 in JP Application No. 2016-570314.
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6. https://ieeexplore.ieee.org/document/6713767? source=IQplus (Year: 2013).
Dodson et al. Secure, Consumer-Friendly Web Authentication and Payments with a Phone.https://citeseerx.ist.psu.edu/viewdoc/ download?doi=10.1.1.675.1085&rep=rep1&type=pdf (Year: 2010).

* cited by examiner

SYSTEMS AND METHODS FOR PROVISIONING TRANSACTION DATA TO MOBILE COMMUNICATIONS DEVICES

CLAIM OF PRIORITY

This application is a continuation application of U.S. application Ser. No. 16/821,183, filed Mar. 17, 2020, entitled "SYSTEMS AND METHODS FOR PROVISIONING TRANSACTION DATA TO MOBILE COMMUNICATIONS", which is a continuation application of U.S. application Ser. No. 14/293,864, filed Jun. 2, 2014, entitled "SYSTEMS AND METHODS FOR PROVISIONING TRANSACTION DATA TO MOBILE COMMUNICATIONS DEVICES" which applications are entirely incorporated herein by reference.

FIELD OF INVENTION

The present disclosure generally relates to providing transaction data to a mobile device, and more particularly to approving and providing transaction data to a mobile device during a single http session.

BACKGROUND OF INVENTION

Typically, consumers applying for credit have had to wait for approval. If approved, consumers also needed to wait for a transaction instrument (e.g., a credit card) to arrive in the mail. Systems and methods which would facilitate and expedite the approval and distribution processes are therefore desirable.

SUMMARY OF THE INVENTION

A method comprising approving, by a computer-based system configured to provide transaction account data to a mobile communications device, a credit application during an hap session, transmitting, by the computer-based system, an encoded secure token to a web-client participating in the single hap session, receiving, by the computer-based system and from the mobile communications device, the secure token, and/or transmitting, by the computer-based system, the transaction account data to the mobile communications device in response to the receiving the secure token. The method may further comprise receiving, by the computer-based system, the secure token decoded by the mobile communications device. The method may further comprise encoding, by the computer-based system, the secure token for display by the web-client. The method may further comprise validating, by the computer-based system, the secure token received from the mobile communications device. The method may further comprise comparing, by the computer-based system, the secure token received from the mobile communications device to the secure token transmitted to the web-client to validate the mobile communications device. The method may further comprise transmitting, by the computer-based system, the transaction account data to the mobile communications device in response to the validating the mobile communications device. In various embodiments, the mobile communications device may be configured to store the transaction account data for presentation to a point of sale terminal during a transaction request.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "financial institution," "transaction account issuer" and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument," or "transaction account product" may be used interchangeably throughout to refer to a financial instrument. As used herein, an account code may or may not be associated with a physical financial instrument.

Phrases and terms similar to a "buyer," "participant", "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases or terms similar to a "processor" (such as a payment processor) or "transaction account issuer" may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other faun.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, QR codes, Bluetooth, Near Field Communication, or a transponder and RFID reader in RF communication with the transponder (which may include a fob). Typical devices may include, for example, a key ring, tag, card, cell phone, wristwatch or any such form capable of being presented for interrogation.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen-digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from a contactless (e.g., an RFID device) to a contactless (e.g., RFID) reader or from the contactless reader to the merchant system in a variety of formats, e.g., magnetic stripe or multi-track magnetic stripe format.

As used herein, an http session may comprise an impermanent interactive communication exchange between a first web-client (as described herein) and a second web-client and/or between a front-end system, such as a web-client (e.g., a mobile device or personal computer) and a backend system (e.g., a transaction account issuer server or server system).

Figure 1A:
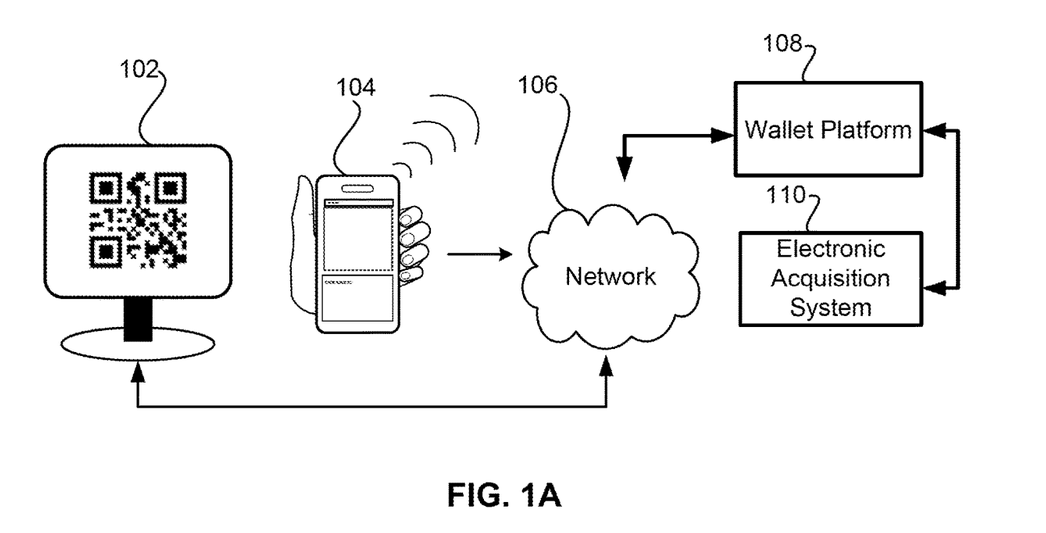
FIG. 1A illustrates, in accordance with various embodiments, a system for providing transaction account data to a mobile communications device.

Referring to FIG. 1A, a system 100 for approving and providing credit and transaction account data during an http session is shown. The system may include a first web-client 102 (such as a personal computing device), a second web-client 104 (such as a mobile computing device), a network 106, a wallet platform 108, and/or an electronic acquisition system 110.

A web-client may include any device (e.g., personal computing device/mobile communication device) which communicates via any network. A web-client may be associated with and/or used by a consumer, a merchant, or both. A web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the faun of a computer or processor, or a set of computers/processors, although other types of computing units or systems may be used, including laptops, notebooks, hand held computers, personal digital assistants, cellular phones, smart phones (e.g., iPhone®, BlackBerry®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network 104.

As those skilled in the art will appreciate, a web-client may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and 0ln. Transactions originating at a web client may pass through a firewall (not shown; see below) in order to prevent unauthorized access from users of other networks.

A network 106 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although a network 104 may be described herein as being implemented with TCP/IP communications protocols, the network 104 may also be implemented using IPX, Appletalk, IP-6, NetBIOS, OSI, any tunneling protocol (e.g. IPsec, SSH), or any number of existing or future protocols. If the network 106 is in the nature of a public network, such as the Internet, it may be advantageous to presume the network 104 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 106 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 104 may be implemented variously. For example, network 104 may be implemented as an interactive television (ITV) network. The systems and methods disclosed herein contemplate the use, sale and/or distribution of any goods, services or information over any network having functionality similar to that described above with reference to network 104.

A wallet platform 108 may comprise any type of hardware and/or software (e.g., a computer server or computer server system) configured or configurable to provide and/or transmit information associated with a transaction account (such as an account token or quick response ("QR" code) that encodes account data, such as an account token).

An electronic acquisition system may comprise any type of hardware and/or software (e.g., a computer server or computer server system) configured or configurable to approve and/or decline an application for credit and/or provide and/or transmit information associated with a transaction account (such as an account token or quick response ("QR" code) that encodes an account token and/or the like).

Figure 2:
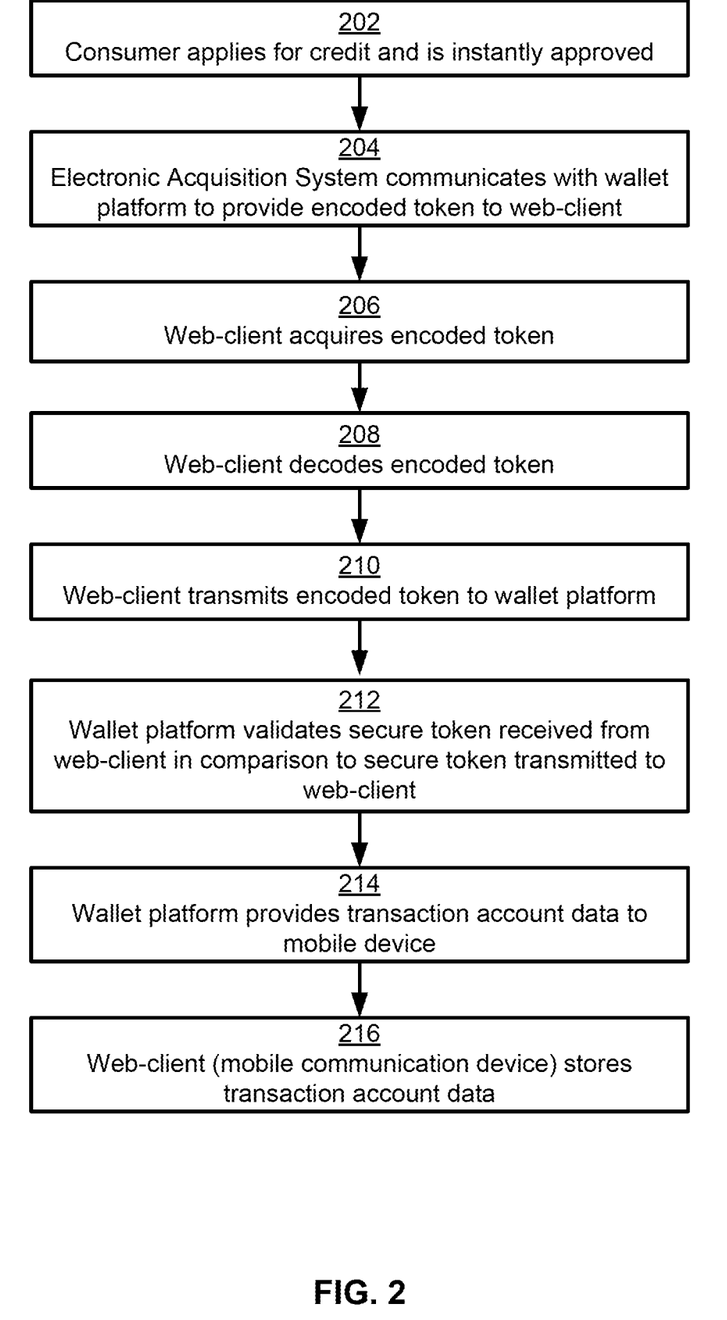
FIG. 2 illustrates, in accordance with various embodiments, a process for providing transaction account data to a mobile communications device.

With reference to FIG. 2, an exemplary process 200 for approving a credit application during an http session and providing transaction account data to a web-client 104 (e.g., a mobile communications device) during the http session is disclosed. In various embodiments, a consumer may apply for credit during an http session, and, during the same session, receive approval for the credit application. Thus, as used herein, a consumer may be "instantly" approved (or declined) credit during the single http session. Instant credit approval, as described briefly herein, may be further disclosed by Crawford et al., U.S. Pat. No. 8,336,764, entitled FRAUD CONTROL WHEN GRANTING INSTANT CREDIT, and issued Dec. 25, 2012. In various embodiments, the http session may comprise more than one http session and the approval may be provided after a certain time period.

Accordingly, a consumer may apply for credit via a web-client 102 in communication with a backend system such as an electronic acquisition system 110 through network 106 (step 202). The electronic acquisition system 110 may instantly grant the consumer credit, as described above. Having granted the consumer credit, the electronic acquisition system 110 may communicate with the wallet platform 108 to instruct the wallet platform 108 to encode transaction account data as well as to transmit that transaction account data to the web client 102. For example, in various embodiments, the electronic acquisition system 110 may instruct the wallet platform to generate a token (or a "secure provisioning token"), such as random number, and to encode that token in one of a variety of formats, such as, for example, in a quick response ("QR" code) (step 204). The wallet platform 108 may transmit the encoded token to the web-client 102 via the network 106.

In response to receiving such an encoded token, the web client 102 may display the encoded token via a display coupled to or comprising the web client 102, and a consumer who, viewing the display, may visually observe the encoded data. A consumer may, in response, utilize a web-client 104 (e.g., a mobile communications device) to scan, photograph, or otherwise acquire the displayed encoded data (e.g., the QR code encoding the secure token) (step 206).

In various embodiments, the web-client 104 may include and/or acquire (e.g., download as an application from an application provider) an application (e.g., software) that enables the web-client 104 to acquire and/or read and/or decode the encoded secure token. If any portion of the application needed to acquire and/or decode the encoded secure token is not present on the web-client 104, the web-client 104 may prompt the consumer to download, from an application provider (e.g., from the wallet platform 108) a software application suitable for such a purpose.

Therefore, the application residing on the web-client 104 may, as described herein, decode (as described herein or as is known in the art) the encoded data acquired from the web-client 102 to retrieve the secure token (step 208). As described above, the secure token may comprise a random number generated by the wallet platform 108 and/or any other identifier or identifying information that may be used to identify the consumer's credit application and/or approval thereof and/or the credit account created as a result of approval of the credit application.

Having decoded the encoded secure token, the web-client 104 may transmit the secure token (encoded or decoded and/or encrypted or unencrypted) to the wallet platform 108 via the network 106 (step 210). The wallet platform 108 may compare the secure token that it receives from the web-client 104 to the secure token that it provided (as encoded data) to the web client 102 to verify that the web-client 102 is associated with the web-client 104 through which instant credit as approved, as described above, by the electronic acquisition system 110 (step 212). In other words, the wallet platform 108 may ensure that the mobile communications device/web-client 102 should receive transaction account data by comparing the secure token returned by the web-client 102 to the wallet platform. 108 and acquired, by the web-client 102, from the web-client 104 through which credit was requested and approved.

In response to validating the secure token, the wallet platform 108 may provide (encoded or decoded and/or encrypted and/or unencrypted) transaction account data (e.g., a transaction account number, an expiration date, a customer name, and the like) to the mobile communications device/web-client 102 via the network 106 and/or via a telecommunications network provided by a telecommunications provider (step 214). The transaction account data may be associated with the transaction account that was requested and approved "instantly" by the electronic acquisitions system 110 (as described above). The mobile communications device/web-client 102 may, in response to receipt of the transaction account data, store the data (step 216).

Figure 1B:
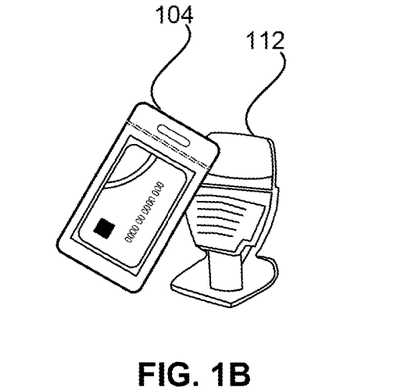
FIG. 1B illustrates, in accordance with various embodiments, a mobile communications device in communication with a contactless point of sale terminal.

Thus, in various embodiments, the system 100 may instantly (e.g., during a single http session) approve a consumer's request for credit, create a transaction account based upon the request and approval, and provide, via a network, an electronic version of the consumer's credit card (i.e., transaction account data). Further, and with reference to FIG. 1B, having stored this transaction account data on a web-client 102, a consumer may utilize the web-client 102 as a payment instrument. For example, the consumer may place the web-client 102 in proximity to a contactless payment point of sale terminal 112 to transmit transaction data stored by the web-client to the terminal 112 as part of a transaction. Any portion or all of the data transfer, interface, transmission and/or exchange may be accomplished via, for example, near field communication (NFC), Bluetooth, radio frequency, card image acquisition, etc. Similarly, where the point of sale terminal 112 comprises a "reader" such as a bar code reader or QR code reader, the web-client 102 may be configured to encode and display the transaction account data stored in its memory such that the point of sale terminal 112 is enabled to scan or "read" the encoded transaction account data displayed by the web-client 102. Further still, the web-client/mobile communications device 102 may be configured to display an image of a transaction instrument (e.g., a credit card) that may me acquired or otherwise captured by an image capture device, such as a camera. In this regard, the web-client 102 may be used as part of a gesture-recognition security system, as disclosed by Aidasani et al., U.S. Pat. No. 8,172,135, entitled SYSTEMS AND METHODS FOR GESTURE-BASED INTERACTION WITH COMPUTER SYSTEMS, filed on Jun. 24, 2011, and issued on May 8, 2012, which is hereby incorporated by reference in its entirety.

In the detailed description herein, references to "one embodiment", "an embodiment", "an example embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, 0S2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

A firewall may comprise any hardware and/or software suitably configured to protect system 100 components and/or enterprise computing resources from users of other networks. Further, a firewall may be configured to limit or restrict access to various systems and components behind the firewall for web clients 102 connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

Encryption may be performed by way of any of the techniques now available in the art or which may become available (e.g., Twofish, RSA, EI Gamal, Schorr signature, DSA, PGP, PKI, and symmetric and asymmetric cryptosystems).

The computers discussed herein may provide a suitable website or other Internet-based graphical user interface which is accessible by users. In one embodiment, the Microsoft Internet Information Server (IS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Infolinix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third-party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, handheld computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand-alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
   a first computing device comprising a processor and a memory; and
   at least one application stored in the memory of the first computing device that, when executed by the first computing device, causes the first computing device to:
   in response to an application by a user being approved in a Hypertext Transfer Protocol (HTTP) session, generate a secure provisioning token indicating a creation of a transaction account for the user in a same HTTP session,
   in the same HTTP session, encode the secure provisioning token as a quick response (QR) code, and
   in the same HTTP session, transmit the secure provisioning token, encoded as the QR code, to a second computing device, wherein the QR code is displayed to the user; and
   a client device associated with the user, the client device comprising a processor and a memory; and
   at least one application stored in the memory of the client device that, when executed by the client device, causes the client device in the same HTTP session to:
   capture the QR code,
   decode the QR code to obtain the secure provisioning token,
   send a request from the client device for transaction account data associated with the transaction account to the first computing device, the request comprising a client-provided token that is based on the QR code that is displayed to the user,
   wherein in the same HTTP session, the first computing device is further configured to:
   validate the client-provided token based on a determination that the client-provided token matches the secure provisioning token, and
   transmit the transaction account data associated with the transaction account to the client device in response to validating the client-provided token, and
   wherein the client device is further configured to:
   provide the transaction account data to a point of sale terminal via a short-range wireless communication channel.

2. The system of claim 1, wherein the secure provisioning token comprises at least one of:
   a first identifier that identifies the application for the transaction account,
   a second identifier that identifies an approval of the application, or
   a third identifier that identifies the transaction account created as a result of the approval of the application.

3. The system of claim 1, wherein the at least one application causes the first computing device to:
   receive a request to create the transaction account for the user from the second computing device; and
   approve the request from the second computing device to create the transaction account.

4. The system of claim 1, wherein the transaction account data comprises at least one of:
   a transaction account identifier,
   an expiration date, or a user name.

5. A method, comprising:
   in response to an approval of an application for a transaction account by a user being approved in a Hypertext Transfer Protocol (HTTP) session, generating a first secure token by a first computing device, wherein the first secure token identifies the creation of the transaction account in a same HTTP session;
   by the first computing device, encoding the first secure token as a quick response (QR) code in the same HTTP session;
   by the first computing device, transmitting the first secure token, encoded as the QR code, to a second computing device in the same HTTP session, wherein the QR code is displayed to the user by the second computing device;
   by a client device associated with the user, capturing the QR code in the same HTTP session;
   by the client device, decoding the QR code to obtain the first secure token in the same HTTP session;
   by the client device, sending a request for transaction account data associated with the transaction account to the first computing device in the same HTTP session, the request comprising a second secure token that is based on the QR code that is displayed to the user;
   by the first computing device, validating the second secure token by determining that the second secure token matches the first secure token transmitted to the second computing device in the same HTTP session;

by the first computing device, transmitting the transaction account data to the client device in the same HTTP session; and by the client device, providing the transaction account data to a point of sale terminal via a short-range wireless communication channel.

6. The method of claim 5, further comprising:

encoding the transaction account data; and transmitting the transaction account data encoded to the client device.

7. The method of claim 5, wherein the transaction account data comprises at least one of:

a transaction account identifier, an expiration date, or a customer name.

8. The method of claim 5, wherein the application for the transaction account is received from the second computing device.

9. The method of claim 5, wherein the first secure token comprises at least one of:

a first identifier that identifies the application for the transaction account, a second identifier that identifies the approval of the application, or a third identifier that identifies the transaction account created as a result of the approval of the application.

* * * * *